July 18, 1950 S. R. RICH 2,515,472
NAVIGATION SYSTEM
Filed April 16, 1948 5 Sheets-Sheet 1

INVENTOR
STANLEY R. RICH
BY
ATTORNEY

July 18, 1950   S. R. RICH   2,515,472
NAVIGATION SYSTEM
Filed April 16, 1948   5 Sheets-Sheet 2

INVENTOR
STANLEY R. RICH
BY
ATTORNEY

INVENTOR
STANLEY R. RICH
BY
ATTORNEY

INVENTOR
STANLEY R. RICH
BY
ATTORNEY

Patented July 18, 1950

2,515,472

UNITED STATES PATENT OFFICE 2,515,472

NAVIGATION SYSTEM

Stanley R. Rich, Newton Center, Mass., assignor to Raytheon Manufacturing Company, a corporation of Delaware Application April 16, 1948, Serial No. 21,422

4 Claims. (Cl. 177—385)

This invention relates to navigation in crowded harbors and particularly to a novel system for guiding vessels along predetermined lanes in narrow channels. It may also be employed in offshore channel navigation.

The invention has particular value in that it employs underwater sound signals to transmit intelligence and is therefore not concerned with the presence or absence of light.

Present methods of harbor navigation require the following of floating buoys in order to keep ships in the proper traffic lanes as well as in channels of safe navigable depth. The following of buoys becomes extremely difficult in fog when neither the buoy nor the light with which it may be equipped is visible for any appreciable distance. Whistling and bell buoys can be followed at best only at a very slow rate of speed and then only if all other conditions are very quiet. As a result ships are still forced to wait out a fog rather than risk entering or leaving a fog-bound harbor.

This invention has for its primary object the provision of a system of underwater sound markers for channels and traffic lanes which can be followed by any vessel having only the simplest of listening equipment, and is completely independent of fog conditions.

An additional object of the invention is to provide such a system as can be installed and maintained at a reasonably low cost, will employ known and available components, and will not readily become obsolete. The system of the invention accordingly is adaptable to various situations and may be conveniently altered to various degrees of added complexity to provide additional features.

It is also an object of the invention to provide such a system which requires a minimum of technical skill to enable a navigator to follow the delineated path.

It is another important object of the invention to reduce the chances of collisions in harbors between incoming and outgoing vessels.

Basically, the invention consists of one or more pairs of underwater sound generators located at spaced positions along a channel or traffic lane, one member of the pair being located on each side of the channel or lane. In each pair the members are pulsed at intervals, and the pulse of each member has a distinguishing characteristic; for example, the members may oscillate at different frequencies when pulsed. A person on a vessel sailing between a pair is in a position to hear both generators, for example, with a simple listening or hydrophone arrangement. Pulse lengths as short as 30 milliseconds may be used, in which case the listener can ascertain his position within fifty yards. It should be noted that with the radio Loran system that is now known, such accuracy is not possible, for there the navigator can ascertain his position only within a few miles. That system is therefore not suitable to the purposes of this invention.

In accordance with the basic concept of this invention, the listener navigates the path on which he receives a single note, indicating that first arrival signals from both generators are being received simultaneously. This path is made to be a straight line or a curve depending on channel shape and other harbor requirements. Where it is a straight line, two generators are pulsed simultaneously, so that the locus of points where the first arrival pulses are available simultaneously is a straight line, which is the perpendicular bisector of the line between the generators. To provide a curved path, the two generators are pulsed in sequence, and, as will be explained below, the required locus is a hyperbola, which is made to fit the channel by adjusting the time interval between the pulses. If the navigator is not on the predetermined path or course, he will hear first one and then the other pulse, and can tell them apart by the difference in characteristic, such as pitch. In this way he knows which way to turn to regain his course. This information may also be employed to enable the navigator to keep to one side of a predetermined center line for two-way traffic, as will be explained in detail below.

The invention may be modified and adapted to any of the various situations that arise in negotiating channels and traffic lanes in harbors. The numerous features and advantages of the invention will therefore be best understood from the detailed description thereof that follows. This description refers to the accompanying drawing wherein.

Figure 1:
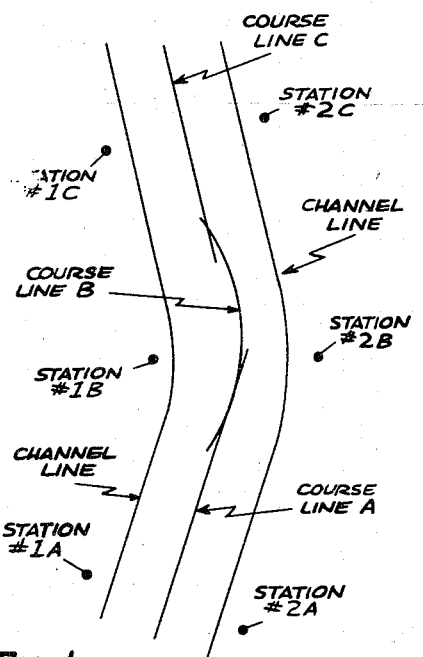
Fig. 1 illustrates the operation of the invention in diagrammatic form.

Referring now to Fig. 1, a ship channel is illustrated, as delineated by a pair of channel lines. It is desired to provide a system that will guide a vessel along the center line of this channel. According to the invention, a plurality of pairs of sound generators are located along the channel, the members of each pair being located one on each side thereof. Thus Stations 1A and 2A comprise one pair, 1B and 2B a second pair, and 1C and 2C a third pair. Stations 1A and 2A are on a straight section of the channel. They are pulsed simultaneously at intervals which, for convenience, may be regular. Assuming that in a particular system the stations of a pair are distinguished by a difference in the pitch of the respective signals, the frequency of sound emitted by Station 1A is different from that of Station 2A; for example, 1A may oscillate at 600 cycles per second when pulsed, while 2A may oscillate at 900 cycles per second. The stations are so located with respect to the channel that the perpendicular bisector of the straight line drawn between them coincides to a satisfactory degree with the center line of the channel in the region of these stations.

This perpendicular bisector is designated as course line A, and is the locus of points which are equidistant from both stations for sound travelling through the water, so that a person on a vessel which is navigated along this line is in a position to hear a single sound, which is a mixture of 600 and 900 cycles per second, whenever the stations are simultaneously pulsed. Thus a navigator who is provided with simple underwater listening equipment needs only to steer the path along which he hears this single mixed signal to remain in the channel and on course line A in even the deepest fog. If he steers or drifts too far to one side or the other, he will hear a sequence of two pulse signals, either a low and then a higher frequency, or vice versa, each time the two stations are pulsed, and will know that he is closer to the station that emits the first frequency he hears. Navigators will, of course, be furnished with the necessary information from which they can mark the locations of the stations and the frequencies of their signals on a chart of the channel, so that one may know which way to turn to sail along course line A. As will be pointed out below, course line A can be regarded as a highway center-line, and, when it is desired to navigate to either side thereof, there is utility for the signals that are received successively rather than simultaneously.

After passing along course line A, the channel curves to the left, in the region of Stations 1B and 2B. Stations 1B and 2B are pulsed in such a fashion that the locus of all points at which the emitted pulses will be heard simultaneously is a curved line which follows the curve in the channel to a satisfactory degree. This line is designated as course line B in Fig. 1. As will be explained in detail below, course line B is curved by pulsing one station of the pair before the other. The direction of curvature is determined by the order of pulsing, and the degree of curvature by the amount of time difference between the pulsing of the first and second stations. In Fig. 1, course line B is curved to the left by pulsing Station 2B prior to Station 1B.

Station 1B emits signals having the same sound frequency as those of 1A, while 2B emits signals having the same sound frequency as those of 2A. As the navigator leaves Stations 1A and 2A behind and approaches 1B and 2B, the signals from the former fade and those from the latter become louder. Where the two paths cross, both pairs of stations will be heard, and a choice of paths may be presented to the navigator, but before he has gone far, the signals from Stations A will become so weak and those from Stations B so strong that there will be no doubt by which to be guided. The signal strengths of the pairs of stations will be so adjusted that there will not be a strong set of signals tending to guide the navigator out of the channel; that is, course line A will peter out in the listening equipment long before the navigator would be guided out of the channel, while course line B will become comparatively so strong that he will make no other choice than to follow it. From course line B the navigator will proceed to another straight course line C, which is produced by the third pair of Stations 1C and 2C in the same fashion as course line A.

The signals that will be heard by the navigator will consist of first arrivals plus reverberation signals. The first arrivals are the signals by which the navigator is guided, the reverberations being ignored. Since the first arrival signals are much louder than the reverberations, this is not difficult. Also, the pulse repetition frequency of the generators need not be high, about once in five to ten seconds being sufficient. This permits ample time for reverberations to die out prior to a successive pulsing of the generators. The pulsing of the various pairs of stations need have no definite interrelation, but, as will be pointed out below in connection with Fig. 6, a sequence can be provided which further reduces the chances of confusion.

Consideration of the problem of planning and laying out course lines in a channel with this invention reveals that there are four ways in which a pair of sound generators may be treated that are of interest. These four cases are:

Case 1.—They may be pulsed simultaneously, and the locus of points of simultaneous arrival is a straight line which is the perpendicular bisector of the line between them. (Course line A);

Case 2.—They may be pulsed in sequence, and the locus of points of simultaneous arrival is that line of which each point is X lineal units from the second station pulsed and X+K lineal units from the first station pulsed, where K is a constant equal to $c \times t$, c being the speed of sound in water, and $t$ the time difference of pulsing;

Case 3.—They may be pulsed simultaneously, and the locus of points of fixed differential time ($t'$) of arrival is that line of which each point is T seconds from the first station heard, and T+$t'$ seconds from the second station heard. T is analogous to X above, and T+$t'$ is analogous to X+K; or Case 4.—They may be pulsed in sequence and the locus of points of fixed differential time ($t'$) of arrival is that line of which each point is T seconds from one of the stations, and T+$t$+$t'$ seconds from the other station, where both $t'$ and $t$ are constants. Again T is analogous to X and $T+t+t'$ is analogous to $X+K$.

From the foregoing, we see that Cases 2, 3 and 4 are of the same nature. Case 2 is employed in Fig. 1 to obtain course line B. Cases 3 and 4 will be discussed further in connection with Fig. 7, particularly some of the various situations that can arise under Case 4.

Figure 2:
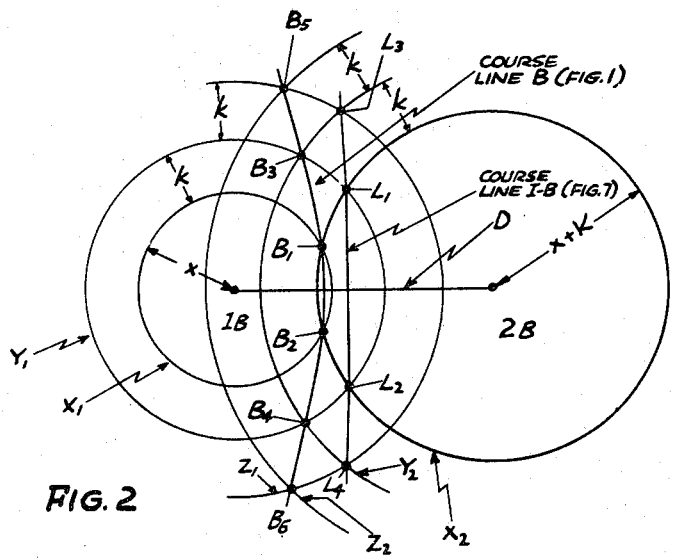
Fig. 2 is a diagram illustrating the derivation of curved paths.

Referring now to Fig. 2, Stations 1B and 2B are shown with a straight line D drawn between them. The actual shape of course line B depends not only on X and $X+K$ as developed above, but also on the length of D, as is apparent from Fig. 2. If we assume that Station 2B is pulsed first, and then Station 1B, then in accordance with Case 2 above, the locus of points of simultaneous arrival of the first arrival signals from both stations is that line which is everywhere X lineal units from Station 1B and $X+K$ lineal units from Station 2B. This locus can be constructed as shown in Fig. 2. A circle $X_1$ having a radius X is constructed with Station 1B as a center, and a second circle $X_2$ having a radius $X+K$ is constructed with Station 2B as a center. The dimension X is chosen sufficiently large for the purposes of Fig. 2 so that the two circles intersect, and the two points of intersection $B_1$ and $B_2$ are marked. Then, an additional pair of circles $Y_1$ and $Y_2$ are constructed on the same centers, respectively, as $X_1$ and $X_2$, each having the radius X or $X+K$ increased by the same value $k$, and their two points of intersection $B_3$ and $B_4$ are marked. In this manner further pairs of circles are constructed about the same centers, each time with the same incremental increase k in radius. Thus circles $Z_1$ and $Z_2$ have as their intersection points $B_5$ and $B_6$. The line connecting the intersection points $B_1$, $B_2$, $B_3$, $B_4$, $B_5$ and $B_6$ is a hyperbola, and is course line B. The distance D being fixed, the amount of curvature of this hyperbola is governed by the value of the constant K, which is to say, by the fixed amount of time delay between pulsing of the two generators 1B and 2B, since $c$ is the same for sound from both stations. It will, of course, be recognized that the constant $k$ represents an identical elapsed time in the travel of both signals to the observer. It will likewise be appreciated that the foregoing discussion with respect to Fig. 2 applies equally well to Cases 3 and 4 mentioned above, it being understood then that K includes also the fixed differential time of arrival.

Figure 3:
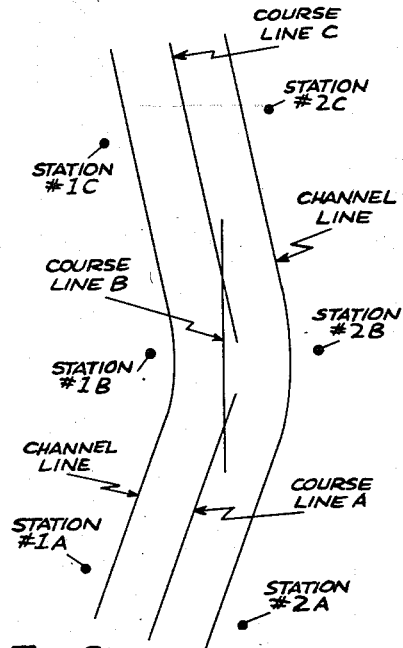
Fig. 3 illustrates the operation of a system that is somewhat simpler than that of Fig. 1.

Referring now to Fig. 3, the invention is there illustrated in a somewhat simpler form than that shown in Fig. 1, in that course line B is shown as a straight line. When the bend in the channel is slight, it is not always necessary to curve the course line to fit, but, depending on the width of the channel, the conditions to either side of it, and the traffic conditions, it may often be satisfactory merely to employ a series of straight course lines having different respective directions. Such an arrangement is that of Fig. 3, and it is otherwise the same as that of Fig. 1.

Figure 4:
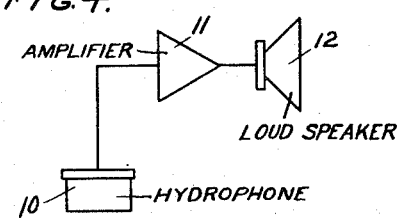
Fig. 4 is a schematic diagram of a listening device.

As has been stated, one need be equipped with only the simplest kind of listening apparatus in order to take advantage of the system of the invention. Such an apparatus is shown in Fig. 4, where a hydrophone 10 is connected to a suitable amplifier 11, which furnishes output signals to a loud speaker 12. The hydrophone 10 is preferably omnidirectional in construction, and is installed in such a location on the vessel that it will so function. Obviously, in an even simpler arrangement, a stethoscope-like listening arrangement known as a seat-tube, such as is familiar in the older art, may be employed, if desired; or, the two pulses can be separately amplified and compared, as is done in the arrangement shown in Fig. 8. The hydrophone 10 then feeds into two filters 13 and 14 in parallel, each of which passes only the frequency of one of the stations. Thus, one filter 13 is set for $f_1=600$ C. P. S., and the other filter 14 is set for $f_2=900$ C. P. S. Each filter feeds into an amplifier 15 or 16, respectively, which provide two separate output signals at $O_1$ and $O_2$, respectively. The loud speaker 12 is provided with the output of both amplifiers in parallel, a suitable resistor 17 or 18 being connected in series with the speaker in the output of each amplifier. Where the input impedance to the speaker is 500 ohms, these resistors are preferably about 10,000 ohms each, so that the output signals will be present at $O_1$ and $O_2$ at a sufficiently high level for use in a time comparison circuit. Such a circuit is shown in Fig. 9 and will be considered in connection with Fig. 7.

Figure 5:
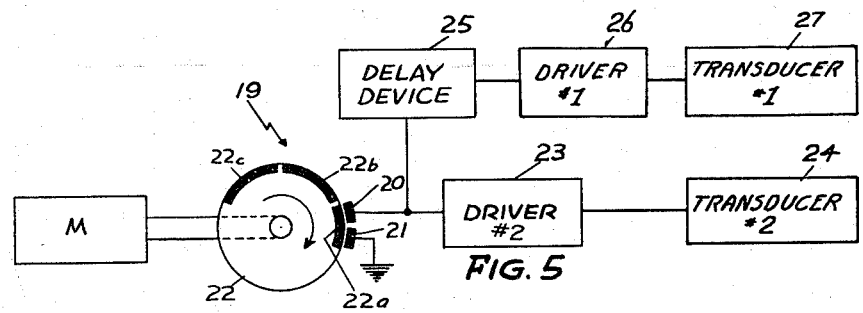
Fig. 5 is a block diagram of a transmitting system.

The signal generating equipment is composed of well-known parts, as shown, for example, in Fig. 5. A keying device 19, which may be a coder, controls the output of two transducers 24 and 27, one for each station of a pair. The coder comprises generally a pair of switch contacts 20 and 21 and a rotatable commutator 22, rotated by a motor M. The commutator has switch segments 22a, 22b, and 22c, each of which successively closes the switch 20—21 when it is rotated. Segment 22a is of one length, and segments 22b and 22c are of a different, longer length, so that when the commutator 20 is rotated in the direction indicated by the arrow, the switch 20—21 is closed for a short period followed by two longer periods, which is the Morse code letter W. The commutator is designed and rotated at a suitable speed to provide the most suitable repetition frequency and interval between signals. The utility of the coder for purposes other than keying will be explained in detail below. In its function as a keying device, the coder keys two drivers 23 and 26, one for each of the transducers 24 and 27, respectively. As shown, the keying switch 20—21 completes a circuit to ground when closed. The keying circuit may be isolated from ground if so desired. The keying signal to one of the drivers 26 is fed through a delay line 25, which serves to delay the output from one transducer 27 with respect to the output from the other transducer 24. Thus, if transducers 27 and 24 are the sound producers of Stations 1B and 2B, respectively, the system of Fig. 5 can be set up to emit, for each keying operation of the coder 22, a pulse from Station 2B and thereafter a pulse from Station 1B, the time delay between these pulses being controlled by the delay device 25. The delay device can be omitted where a straight path (Stations A or C) is desired, or placed in the line to the other driver 23 where the curvature of the path is to be reversed.

Figure 6:
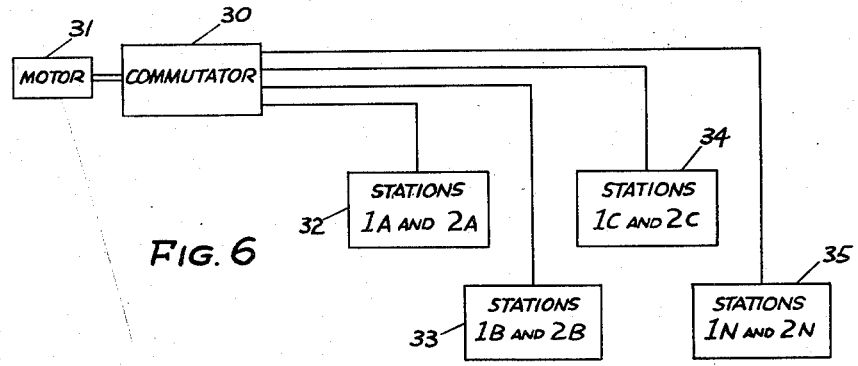
Fig. 6 is a block diagram of a more complex transmitting system.

As has been mentioned, there is some possibility of confusion when the navigator is transferring his observations from one pair of stations to the next pair along his path. The arrangements shown in Figs. 5 and 6 are provided to eliminate such confusion completely, and are particularly valuable in crowded harbors or channels where the region to either side is dangerous. To enable a navigator to distinguish between sets of stations, the various pairs may be provided with characteristic codes, in any well-known fashion. Thus the A stations may be pulsed with a dash, while the B stations may be pulsed with two dots, and the C stations with a dot and a dash. As shown in Fig. 5, it is necessary only to employ the coder 19 to key the drivers 23 and 26 to accomplish this.

Confusion between adjacent pairs of stations can be minimized also with the system shown in Fig. 6. There each of the pairs of stations is brought to a commutator switch 30, which is driven by a motor 31. The pairs of stations and their respective drivers are each represented by a block 32, 33 or 34, and block 35 represents the Nth pair of stations. The commutator switch functions in the usual manner to key the pairs of stations in succession, one pair at a time. Keying is maintained at a low repetition rate so that a navigator will not hear the signals of two pairs of stations together. This also permits reverberations to die out between the keying of adjacent stations. The arrangement of Fig. 6 also enables a navigator to pick out the signals of the next pair of stations that he is going to use before he begins actually to use them.

Figure 6A:
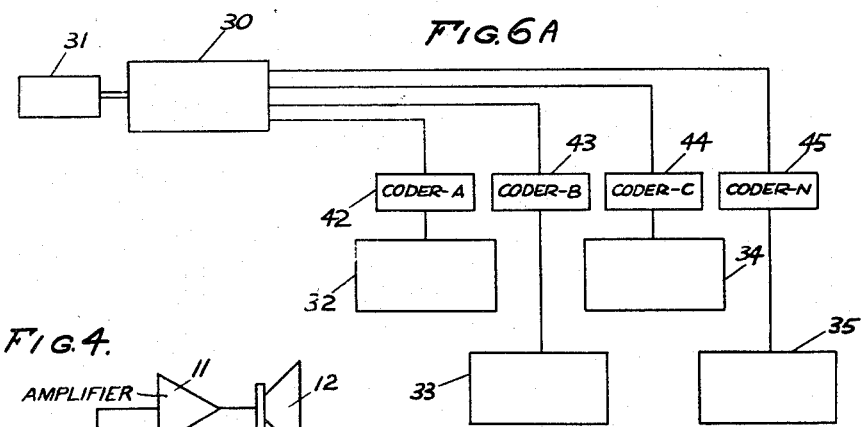
Fig. 6A illustrates an improved arrangement of the system of Fig. 6.

As shown in Fig. 6A, the coding arrangement of Fig. 5 can be incorporated into the system of Fig. 6 by placing individual coders 42, 43, 44 and 45 in the lines between the commutator 30 and the pairs of stations 32, 33, 34 and 35, respectively, and thereby keying the respective pairs of stations through their own individual coders. In this manner, in addition to providing that the signals from the successive pairs of stations shall occur in a predetermined sequence, the signals from each pair of stations have a characteristic code.

Figure 7:
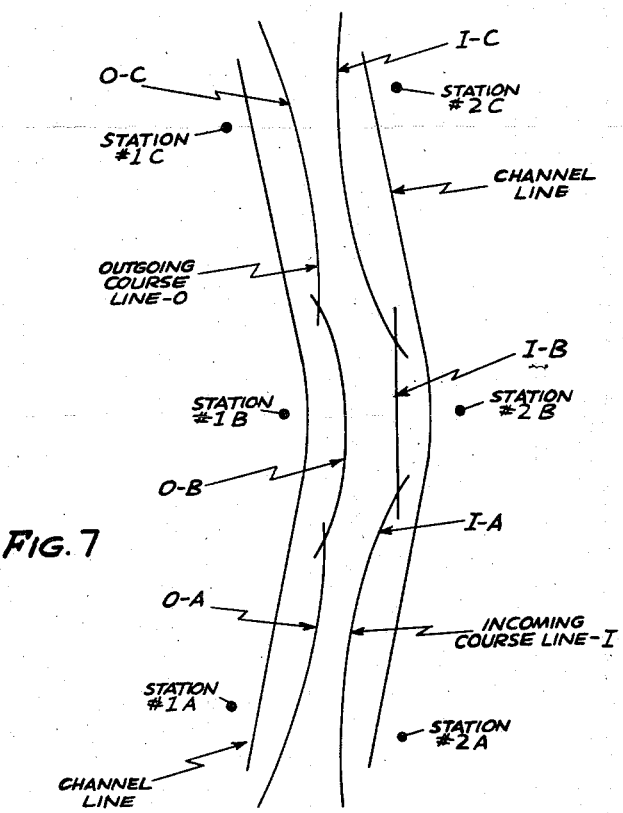
Fig. 7 illustrates diagrammatically the invention as applied to two-lane bidirectional traffic in a single channel.

Recalling now Cases 3 and 4 from the discussion above, it will be remembered that in each case the path that is the locus of points of constant time difference of arrival of the first arrival signals from a pair of stations is a hyperbola. By arbitrarily choosing two sets of particular fixed time differences and orders of arrival for each pair of stations, two separate marked paths can be provided for incoming and outgoing traffic. Fig. 7 illustrates how an incoming course line I and an outgoing course line O can be provided in the same channel, so that two-way traffic can be handled. The incoming course line I is made up of section I—A for Stations 1A and 2A, section I—B for Stations 1B and 2B, and section I—C for Stations 1C and 2C. Similarly, the outgoing course line is made up of sections O—C, O—B, and O—A. Each section of each course line has a predetermined fixed time difference and order of arrival for the pulses from its pair of stations.

Where the channel is straight or nearly so, the stations of a pair are pulsed simultaneously, as in Case 3. Such stations are the A stations and the C stations. A navigator negotiating the incoming course line I is then in a position to hear the #2 member of each of these pairs first, while on the outgoing course line O he will be in a position to hear the #1 member first. Where the channel curves to an appreciable degree, the two B stations are pulsed in sequence as in Fig. 1. Then Case 4 applies, and the navigator on the incoming course line negotiates a path that is nearer to the #2 station than to the #1 station than is the corresponding course section B in Fig. 1. As a result, the signal from Station 2B not only starts first, but also arrives first. Referring again to Fig. 2, we recall that circles $X_1$ and $X_2$ exist simultaneously, while $Y_1$ and $Y_2$ exist simultaneously, and the same is true of $Z_1$ and $Z_2$. However, if the navigator is to occupy a position such that the wave front represented by circle $X_2$ passes him first, and then, a fixed time later the wave front represented by circle $Y_1$ passes, which is the condition when he negotiates incoming course section I—B, then the line that determines section I—B is the locus of points $L_1$, $L_2$, $L_3$ and $L_4$, which has considerably less curvature than line B. This is to be expected, for the curvature that is imparted to line B by starting the pulse from 2B prior to the pulse from 1B and receiving them simultaneously is changed in Fig. 7 by receiving the pulse from 2B prior to the pulse from 1B. For the same reasons, the outgoing course section O—B has a more pronounced curvature than line B in Fig. 1, for here the pulse from 2B is not only started earlier than the 1B pulse, but it is also received later. From the navigator's point of view, the effect is the same as on the straight stretches of the channel; on the incoming course the Station 2B pulse arrives first, and on the outgoing course the 1B pulse arrives first.

Thus the navigator may regard the course line in Fig. 1 as the center-line of a highway, and by keeping the pulses of one pitch coming in before the pulses of another pitch, he keeps to the right of the center line. From his charts, he can determine exactly what the time difference should be for each pair of stations to keep himself in the best path to the right of center. The time differences that he must observe for each line for each pair of stations will be furnished to the navigator in advance as part of his instructions for conduct while entering and leaving the harbor. He may employ the apparatus shown in Fig. 8 for determining that he is on a proper course line section. Such an apparatus is particularly valuable in that it tends to reject extraneous noise signals, such as propeller noises from other ships. With this apparatus, the ear alone can be depended upon to recognize and maintain a small time difference between two signals of a pair of stations, making possible safe navigation with very simple listening apparatus. For accurate measurement of the time difference, however, the navigator may employ a time difference indicator, for example, as shown in Fig. 9, and claimed in my copending divisional application S. N. 123,330, filed Oct. 25, 1949.

Figure 8:
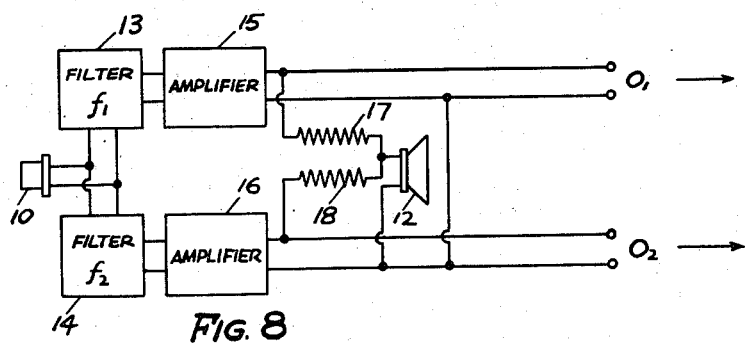
Fig. 8 illustrates schematically a listening device suitable for use with the system of Fig. 7.
Figure 9:
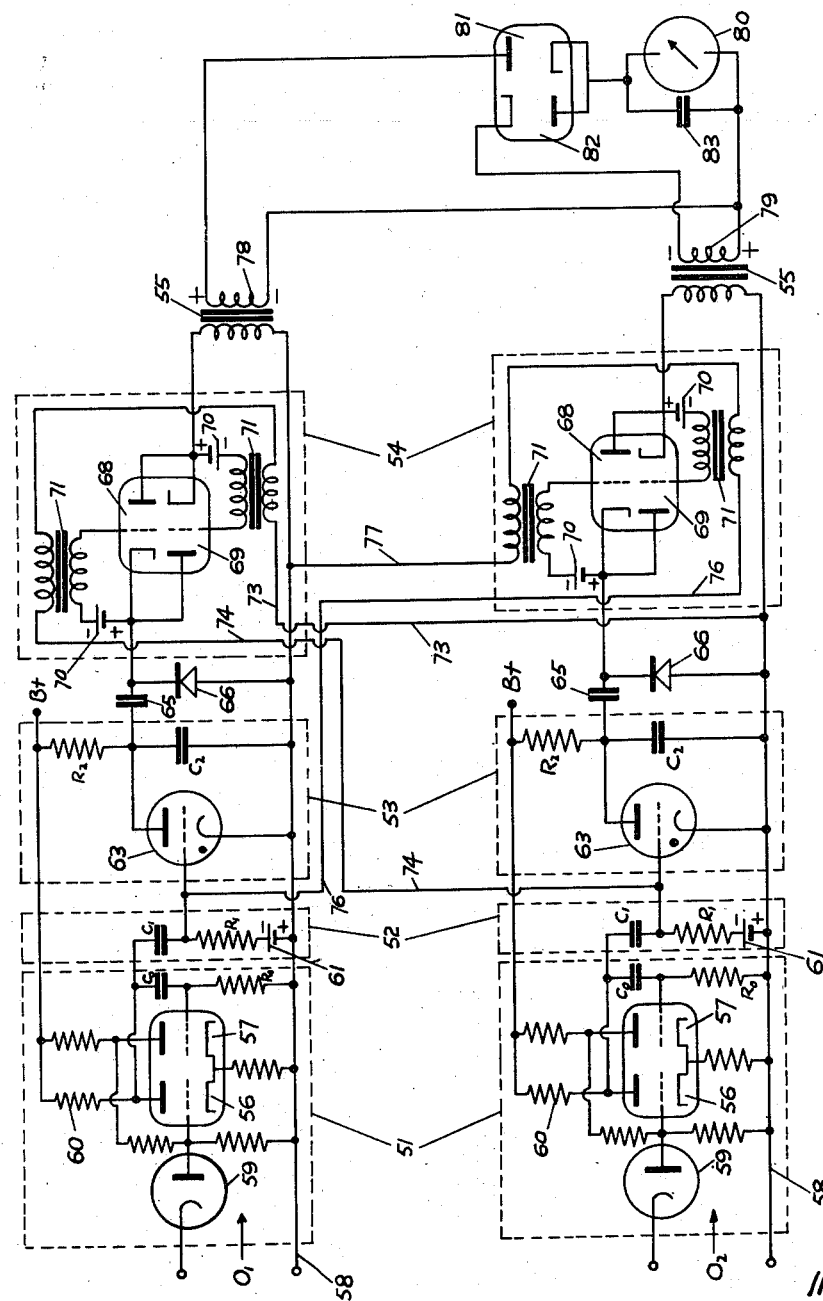
Fig. 9 illustrates measuring apparatus that may be used with the device shown in Fig. 8.

The time difference indicator of Fig. 9 employs two identical channels, connected one to output $O_1$ and the other to output $O_2$ of the device of Fig. 8, in each of which there is generated a single sharp voltage pulse or "spike" in response to the first arrival signal from the corresponding station of the pair under observation. Each spike initiates a sawtooth voltage wave in its own channel and controls a normally open gate stage in the other channel. The output of the sawtooth voltage stage of each channel is momentarily made available through the gate circuit of that channel, to a meter into which both channels feed, and which indicates the amount and sense of the time difference. Since both signal channels are identical, one will be described and the same reference characters are applied to like parts of each.

Figure 10:
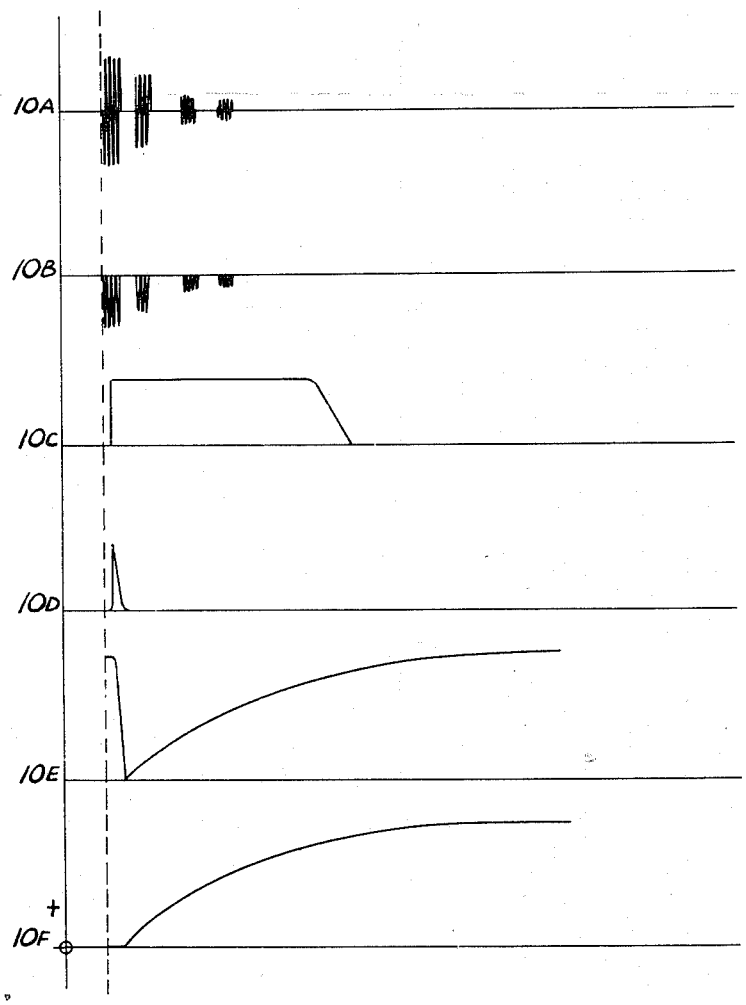
Fig. 10 illustrates typical voltage waves that exist in the circuits of Fig. 9.

Each signal channel comprises a single-pulse multivibrator 51, a differentiating circuit 52, a sawtooth sweep generator 53, a gate circuit 54, and an output pulse transformer 55. The multivibrator 51 comprises two triodes 56 and 57, of which the first 56 is arranged to be normally conductive in the absence of signals and the second simultaneously non-conductive. A capacitor $C_0$ is connected from the anode of triode 56 to the control grid of triode 57, and a resistor $R_0$ is connected from that control grid to the common negative bus 58. A diode 59 is provided in the input circuit of the multivibrator and connected so that negative voltages only appear on the control grid of the normally conductive triode 56 in response to signals from the station under observation. As shown in Fig. 10, at 10A, the signal from a station consists of a first arrival pulse of oscillations of comparatively large amplitude, plus reverberations. The negative portion of this signal, shown at 10B, appears on the grid of triode 56. This cuts off the first triode 56 and the anode thereof becomes suddenly more positive due to the cessation of current flow in the anode resistor 60. The second triode 57 is then rendered conductive through the RC circuit $C_0R_0$, which has a time constant of the order of three seconds. The single pulse that is provided by the multivibrator is shown in 10C, and endures long enough for the reverberations to die out. This pulse is taken off at the anode of the first triode 56, and is therefore positive. The negative reverberation pulses in 10B that follow the first arrival pulse do not affect the conductive state of the multivibrator except to maintain the first triode non-conductive.

The differentiating circuit 52 comprises a capacitor $C_1$ and a resistor $R_1$ in series. The capacitor $C_1$ is connected to the anode of the first multivibrator triode 56 and the resistor is connected to the negative bus 58 through a battery 61, the purpose of which will be presently explained. The time constant of $C_1R_1$ is of the order of 1 millisecond, and a very short positive pulse or "spike" appears across $R_1$ in response to the initiation or leading edge of the multivibrator output pulse. This spike is shown in Fig. 10 at 10D.

The sawtooth generator 53 comprises a gaseous discharge tube 63 which may be a Thyratron, a charging resistor $R_2$ and a charging capacitor $C_2$. The control grid of the tube 63 is connected to the differentiating circuit 52 at the junction of $C_1$ and $R_1$, while the cathode thereof is connected to the common bus 58. The battery 61 is connected to the bus 58 at its positive terminal, and thereby furnishes a negative bias to the tube 63, maintaining the tube non-conductive in the absence of signals. The time constant of the circuit $R_2C_2$ is of the order of three seconds so that the capacitor $C_2$ is charged to the steady state value prior to the arrival of a spike from the differentiator 52. When it arrives, the spike renders the gas tube 63 momentarily conductive, the capacitor $C_2$ is substantially instantaneously discharged through the tube, and a charging cycle commences almost immediately, for the spike is very short. Thus a sawtooth voltage wave is provided in response to the spike, as shown in Fig. 10, at 10E. The sawtooth voltage wave is provided to the output transformer 55 through a coupling capacitor 65 and the gate circuit 54.

The coupling capacitor 65 isolates the stages of the channel that follow the sawtooth generator 53 from the B+ supply. A unidirectional conductor 66 is connected across the output of the saw tooth voltage generator, on the isolated side of the channel. This conductor is connected in opposition to the normal B+ supply, so that, when the gas tube 63 is non-conductive, it does not interfere with the normal charging of the capacitor $C_2$, but when the tube conducts, it prevents $C_2$ from charging in the reverse direction by short-circuiting reverse charging current surges. It thus functions as a "D. C. restorer"; that is, it prevents the sweep voltage from swinging below the zero level during the discharge of the sweep capacitor $C_2$. The sweep voltage that is available to the gate circuit is shown in Fig. 10, at 10F. This sweep voltage starts at the zero level, which is the level of the bus 58.

The gate circuit 54 is described in detail and claimed in copending application Serial No. 788,811, filed November 29, 1947, issued February 7, 1950 as Patent No. 2,496,900, and comprises a pair of triode sections 68 and 69 reversely connected in parallel in the input circuit of the transformer 55. Each section is biased to cut-off by a battery 70, and is provided with a control transformer 71. The battery 70 and the secondary of the transformer 71 are in each section connected together in series between the grid and cathode. The two primary windings of the transformers 71 of one channel are connected in series across the resistor $R_1$ of the differentiating circuit 52 of the other signal channel. The connections from the gate of the $O_1$ channel are via wires 73 and 74 to the differentiating circuit of the $O_2$ channel, and the connections from the gate of the $O_2$ channel are via wires 76 and 77 to the differentiating circuit of the $O_1$ channel. Thus the $O_1$ channel has its gate controlled by the spike from the $O_2$ channel, and the $O_2$ channel has its gate controlled by the spike from the $O_1$ channel.

The secondary windings 78 and 79 of the output gate controlled by the spike from the $O_1$ channel, respectively, are connected to a meter 80 of the type wherein the needle is centered in the absence of a deflection current, and is deflected to one side or the other depending on the direction of the current that flows through it. The two secondary windings 78 and 79 are so phased relative to each other that their output signals tend to deflect the meter needle in opposite directions, and each is connected to the meter through a unidirectional conductor or rectifier 81 or 82, respectively. The rectifiers provide unidirectional currents from the outputs of their respective pulse transformers 55, and since these currents are applied in the opposite sense to the meter 80, there is available to the meter the desired information about both sense and amplitude. A stabilizing capacitor 83 is provided in parallel with the meter.

If the two first arrival signals from a pair of stations are picked up in sequence, one is fed through $O_1$ to one channel, while the other is fed through $O_2$ to the other channel. The differentiator spike (Fig. 10D) which corresponds to the first signal opens the gate 54 of the channel of the second signal, but since $C_2$ of the second signal channel is in the steady state and its potential is isolated by capacitor 65, there is no output through the opened gate, and the meter 80 is not affected. This same spike, however, starts the sawtooth wave in its own signal channel. Thereafter, the differentiator spike from the channel of the second signal opens the gate of the channel of the first signal, and a spike having a peak potential which is determined by the then-existing level of the sawtooth voltage in the channel of the first signal is applied to the meter 80. Thus, the potential of only one of the sawtooth waves is applied to the meter, namely, that which comes from the signal channel carrying the first signal received, and the voltage level at which it is applied is determined by the time difference between the two signals. If the two signals are received simultaneously, both spikes will occur simultaneously and no deflection voltage will be applied to the meter, which is what is desired. The loudspeaker 12 will at all times furnish the information that the signals are being received, so that an operator need refer to the meter only at intervals to secure an accurate measurement of the time difference.

The arrangements of Figs. 5 and 6 may be incorporated in any combination desired into the system of Fig. 7, with all the attendant advantages that have been discussed above. Likewise, the respective signals of the two stations of a pair may be distinguished in any convenient manner. The pulse lengths may be different, or the signals of a pair of stations may be individually coded, for example, with the Morse code letters "A" and "N," respectively, or the frequencies of the respective signals may be swept in opposite direction. No attempt is made herein to exhaust all the possibilities that may come to mind. Further, it will now be apparent that the invention lends itself to the employment of known components, such as hydrophones or other forms of transducers, sound generators, indicators, receivers, drivers, and other parts. Therefore, it is intended that the following claims shall not be limited by the specific details of the foregoing disclosure, but only by the prior art.

What I claim is:

1. Apparatus for guiding a navigator along a predetermined path comprising a pair of underwater sound generators disposed one on each side of said path and at a distance therefrom, and means for successively pulse exciting said generators with a prescribed time difference between excitations.

2. Apparatus for guiding a navigator along a predetermined path comprising a pair of underwater sound generators disposed one on each side of said path and at a distance therefrom, and means for successively pulse exciting said generators with a prescribed time difference between excitations, the disposition of said generators being such that said path is the locus of points at which the first arrival pulses from both generators are in a constant time relation.

3. Apparatus for guiding a navigator along a predetermined curved path comprising a pair of underwater sound generators disposed one on each side of said path and at a distance therefrom, and means for pulse exciting said generators in a predetermined order whereby the locus of points at which the first arrival pulses from said generators are available simultaneously is a curve which substantially follows said path, said order consisting of pulsing the generator which is located on the outside of said curved path prior to the other generator, and with a time difference sufficient to provide said locus with the required curvature.

4. Apparatus for guiding a navigator along a predetermined path comprising a plurality of pairs of underwater sound generators disposed along said path, the members of each pair being on opposite sides of the path and at a distance therefrom, and means for pulse exciting said pairs of generators each with a different characteristic code, and the members of each pair successively with a prescribed time difference between their excitations

STANLEY R. RICH.

REFERENCES CITED

The following references are of record in the file of this patent:

UNITED STATES PATENTS

| Number | Name | Date |
| --- | --- | --- |
| 1,388,949 | Hanson | Aug. 30, 1921 |
| 1,512,051 | Rellstab | Oct. 21, 1924 |
| 1,961,767 | Key | June 5, 1934 |
| 2,101,076 | Laboureru | Dec. 7, 1937 |
| 2,400,552 | Hoover | May 21, 1946 |
| 2,434,644 | Fairweather | Jan. 20, 1948 |

FOREIGN PATENTS

| Number | Country | Date |
| --- | --- | --- |
| 219,726 | Great Britain | Aug. 14, 1924 |
| 537,253 | France | May 19, 1922 |

Certificate of Correction

Patent No. 2,515,472                                            July 18, 1950

STANLEY R. RICH

It is hereby certified that error appears in the printed specification of the above numbered patent requiring correction as follows:

Column 10, line 34, strike out "gate controlled by the spike from the $O_1$ channel." and insert instead *put pulse transformers of the $O_1$ and $O_2$ channels,*;

and that the said Letters Patent should be read as corrected above, so that the same may conform to the record of the case in the Patent Office.

Signed and sealed this 10th day of October, A. D. 1950.

[SEAL]

THOMAS F. MURPHY,
                                                                                  *Assistant Commissioner of Patents.*